US009623455B2

(12) United States Patent
Di Emidio (10) Patent No.: US 9,623,455 B2
(45) Date of Patent: Apr. 18, 2017

(54) TREATMENT OF CLAY OR DREDGED SEDIMENT WITH POLYMER INCREASES ADSORPTION CHARACTERISTICS

(71) Applicant: Universiteit Gent, Ghent (BE)

(72) Inventor: Gemmina Di Emidio, Ghent (BE)

(73) Assignee: Universiteit Gent, Ghent (BE)

( * ) Notice: Subject to any disclaimer, the term of this patent is extended or adjusted under 35 U.S.C. 154(b) by 105 days.

(21) Appl. No.: 14/425,526

(22) PCT Filed: Sep. 6, 2013

(86) PCT No.: PCT/EP2013/068482
§ 371 (c)(1),
(2) Date: Mar. 3, 2015

(87) PCT Pub. No.: WO2014/037511
PCT Pub. Date: Mar. 13, 2014

(65) Prior Publication Data
US 2015/0251230 A1   Sep. 10, 2015

(30) Foreign Application Priority Data

Sep. 10, 2012 (EP) .................................. 12183663

(51) Int. Cl.
*B09B 3/00* (2006.01)
*B09B 1/00* (2006.01)
(Continued)

(52) U.S. Cl.
CPC ............. *B09B 1/004* (2013.01); *B01J 20/12* (2013.01); *B01J 20/24* (2013.01); *B01J 20/2803* (2013.01);
(Continued)

(58) Field of Classification Search
CPC ......... B09B 3/008; B09B 3/00; B09B 3/0025; B09B 3/0033; B09B 3/0041
See application file for complete search history.

(56) References Cited

U.S. PATENT DOCUMENTS 5,173,275 A * 12/1992 Koehler ................... B01J 20/26
423/23
6,386,796 B1    5/2002 Hull
(Continued)

FOREIGN PATENT DOCUMENTS

| WO | 0166275 A2 | 9/2001 |
| WO | 2012025564 A1 | 3/2012 |
| WO | 2014037511 A1 | 3/2014 |

OTHER PUBLICATIONS

Van Den Steen et al., Influence of Polymer-treatment on Hydraulic Conductivity and Adsorption Characteristics of Dredged Sediment, Jun. 1, 2012, Universiteit Gent, Gent, Belgium (machine English translation appended to original).*

(Continued)

*Primary Examiner* — John Kreck
(74) *Attorney, Agent, or Firm* — TraskBritt P.C.

(57) ABSTRACT

The disclosure relates to the field of lining materials which are used to isolate landfill sites in order to avoid pollution of surrounding soil by ions such as heavy metals. Further disclosed is a process to increase the ion adsorption capacity of clay or dredged sediment. More specifically, the disclosed is a process comprising: a) mixing the clay or dredged sediment with an anionic polymer, and b) subsequently drying the mixture, results in a lining material having superior ion adsorption characteristics.

18 Claims, 10 Drawing Sheets

(51) Int. Cl.
| | |
|---|---|
| B01J 20/12 | (2006.01) |
| B01J 20/24 | (2006.01) |
| B01J 20/28 | (2006.01) |
| B01J 20/30 | (2006.01) |
| E02D 31/00 | (2006.01) |
| B09C 1/06 | (2006.01) |
| B09C 1/08 | (2006.01) |
| E02D 3/11 | (2006.01) |

(52) U.S. Cl.
CPC ............ *B01J 20/3078* (2013.01); *B09B 1/00* (2013.01); *B09C 1/06* (2013.01); *B09C 1/08* (2013.01); *E02D 3/11* (2013.01); *E02D 31/004* (2013.01); *B01J 2220/46* (2013.01); *Y02W 30/32* (2015.05)

(56) References Cited

U.S. PATENT DOCUMENTS

| | | |
|---|---|---|
| 6,558,081 B2 | 5/2003 | Hull |
| 2002/0150429 A1 | 10/2002 | Hull |

OTHER PUBLICATIONS

Van Den Steen et al., Influence of Polymer-treatment on Hydraulic Conductivity and Adsorption Characteristics of Dredged Sediment, Nov. 20, 2012, pp. 1-113, English Abstract, Universiteit Gent, Gent, Belgium.
PCT International Search Report, PCT/EP2013/068482, dated Oct. 4, 2013.

* cited by examiner

| Soil | $R_d$ $Mg^{2+}$ | $R_d$ $Cu^{2+}$ | $R_d$ $Pb^{2+}$ |
|---|---|---|---|
| Kaolin | 1.244 | 1.59 | 3.11 |
| Kaolin + 2% CMC | - | 4.91 | 5.15 |
| Kaolin + 8 % CMC | 1.426 | - | - |
| Dredged sediment (DS) | 2.168 | 42.43 | 50.57 |
| DS + 2% CMC | - | 45.93 | 52.1 |
| DS + 8 % CMC | 3.875 | - | - |

Fig. 3 B

| Solution | Concentration | Electrical conductivity | Salinity | pH |
|---|---|---|---|---|
|  | [mg/L] | [mS/cm] | [-] | [-] |
| $MgCl_2$ | 100 | 0.301 | 0 | 6.87 |
| $MgCl_2$ | 600 | 1.382 | 0.5 | 7.04 |
| $MgCl_2$ | 2000 | 4.16 | 2.1 | 7.3 |
| $MgCl_2$ | 6000 | 12.13 | 6.46 | 7.7 |
| $Cu(NO_3)_2$ | 302 | - | - | 6.18 |
| $Cu(NO_3)_2$ | 1812 | - | - | 5.4 |
| $Cu(NO_3)_2$ | 3020 | - | - | 4.62 |
| $Cu(NO_3)_2$ | 6041 | - | - | 5.18 |
| $Cu(NO_3)_2$ | 9061 | - | - | 4.11 |
| $Pb(NO_3)_2$ | 414 | - | - | 5.79 |
| $Pb(NO_3)_2$ | 2481 | - | - | 5.5 |
| $Pb(NO_3)_2$ | 4140 | - | - | 5.26 |
| $Pb(NO_3)_2$ | 12420 | - | - | 4.86 |

TREATMENT OF CLAY OR DREDGED SEDIMENT WITH POLYMER INCREASES ADSORPTION CHARACTERISTICS

CROSS-REFERENCE TO RELATED APPLICATIONS

This application is a national phase entry under 35 U.S.C. §371 of International Patent Application PCT/EP2013/068482, filed Sep. 6, 2013, designating the United States of America and published in English as International Patent Publication WO 2014/037511 A1 on Mar. 13, 2014, which claims the benefit under Article 8 of the Patent Cooperation to European Patent Application Serial No. 12183663.9, filed Sep. 10, 2012.

TECHNICAL FIELD

The disclosure relates to the field of lining materials that are used to isolate landfill sites in order to avoid pollution of surrounding soil by ions such as heavy metals. Disclosed is a process to increase the ion adsorption capacity of clay or dredged sediment. More specifically, the disclosed is a process comprising: a) mixing clay or dredged sediment with an anionic polymer, and b) subsequently drying the mixture, resulting in a lining material having superior ion adsorption characteristics.

BACKGROUND

Landfill sites for both chemical and industrial wastes might be a serious threat to the environment. To avoid pollution of the ground and groundwater, landfill sites are sealed off by use of compacted clay liners (CCL's) or geosynthetic clay liners (GCL's). Advantages of these CCL's/GCL's are that they can have a low permeability, a high stability and a high resistance to damage and puncture.

An important element for CCL's/GCL's is the ion adsorption capacity of the material. Cations such as heavy metals occur naturally in the ecosystem with large variations in concentration. In modern times however, human activities introduce additional and polluting sources of heavy metals in the environment and it is well known that high concentrations of heavy metals may be harmful to health and environment. Within the European community the elements of highest concern are arsenic, cadmium, cobalt, chromium, copper, mercury, manganese, nickel, lead, tin and thallium. It is of importance to avoid contamination of the metals into the environment. Clays which are capable of capturing or adsorbing the contaminants are thus highly needed.

Also the non-contaminated fine part of dredged sediments, which are often mainly composed of silty clay, can be used in CCL's (Di Emidio et al., 2008. ICEG Proceedings 438-444). However, some dredged sediments may contain high concentrations of heavy metals too. Methods to remove the metals from dredged sediment are, for example, described by Fang et al. (J Hazard Mater. 2011: 226-233). However, these methods might be cumbersome and expensive in a commercial setting. Hence, alternative methods to obtain ecofriendly recyclable dredged sediments, such as methods resulting in dredged sediments which retain and don't leach their high levels of heavy metals, are highly needed.

WO2012/025564 discloses clay or dredged sediment obtainable by: a) mixing clay or dredged sediment with an anionic polymer, and b) subsequently dehydrating the mixture. This particular treatment method was shown to increase the water adsorption capacity of the clays and to reduce their hydraulic conductivity to electrolyte solutions such as seawater and calcium chloride for a long time-period so that the treated clays perform better than conventional untreated clays as lining materials. However, it could not be predicted that the latter, treated materials are capable to more efficiently adsorb heavy metals when compared to clays which are not mixed with a polymer.

U.S. Pat. No. 6,558,081 discloses a sealant layer acting as a barrier for contaminants. The latter sealant layer may contain clay and a polymer. However, it could clearly not be predicted that a sealant layer comprising clay and a polymer is capable to significantly adsorb more heavy metals when compared to clays which are not mixed with a polymer.

Van den Steen R. (Master thesis of University of Ghent, Belgium; "Eigenschappen van met polymeren behandeld baggerslib en kaoliniet: Hydraulische conductiviteit en adsorptie"; published on-line on Nov. 20, 2012) discloses that treatment of kaolin clay and dredged sediments with sodium carboxymethyl cellulose improves the adsorption of $Mg^{2+}$ cations.

BRIEF SUMMARY

As indicated above, WO2012/025564 discloses clay or dredged sediment obtainable by: a) mixing clay or dredged sediment with an anionic polymer, and b) subsequently dehydrating the mixture. This particular treatment method was shown to increase the water adsorption capacity of the clays and to reduce their hydraulic conductivity to electrolyte solutions such as seawater and calcium chloride for a long time-period so that the clays are useful as lining materials. However, WO2012/025564 is completely silent about the surprising finding that such clays could also be useful to adsorb heavy metals leaching from the environment or present in dredged sediment onto clay or dredged sediment, respectively. Also, U.S. Pat. No. 6,558,081, as described above, is completely silent about the surprising finding that a mixture of clay (or dredged sediment) and anionic polymer, which is dried after the mixing at a temperature higher than 45° C., will adsorb significantly more heavy metals than could be predicted by simply adding the adsorption capacity of clay (or dredged sediment) and the adsorption capacity of an anionic polymer alone. In other words, the latter mixture shows a synergistic increase (i.e., a significantly higher increase compared to the addition of the adsorption capacities of both the clay and polymer) in adsorption capacity towards heavy metals. It is indeed generally known that clays are capable of adsorbing cations exhibiting metallic properties (Griffin et al., 1976, Environ. Sci. Technolo. 10, 1262-1268) and it is has been described that negatively-charged polymers (such as CMC) have the capability to adsorb the heavy metal copper (Hara et al., 2004, J. Colloids and Surfaces B: Biointerfaces 38 (2004) 227-230 & Bayramoglu et al., 2003, J. Hazardous Materials B101, 285-300). However, when mixing clays/dredged sediments with anionic polymers, it can clearly not be predicted that the mixture would be capable to adsorb significantly ($P<0.05$) more cations exhibiting metallic properties in a synergistic manner when compared to clays/dredged sediments which are not treated with anionic polymers. In contrast, a skilled person would know that the negative charges of the clay and the anionic polymer would be neutralized by the positive charges of salts and cations naturally present at the clay surface so that a mixture of clay/dredged sediment with anionic polymer should not adsorb an additional and significant amount of heavy metals.

Hence, the disclosure relates in first instance to a process for adsorbing heavy metals leaching from the environment onto clay or dredged sediments, or for adsorbing and retaining heavy metals present in dredged sediment, comprising: a) mixing the clay or the dredged sediment with a solution comprising an anionic polymer in order to obtain a mixture, and then b) drying the mixture at a temperature higher than 45° C. in order to irreversibly adsorb the polymer onto the clay or dredged sediment.

DETAILED DESCRIPTION

The term "heavy metals" generally relates to transition metals, metalloids, lanthanides and actinides but specifically relates to toxic cations having metallic properties. Even more specifically, the latter term refers to the following, non-limiting list of elements known to be harmful to humans, animals and the environment when present in high concentrations: arsenic, cadmium, cobalt, chromium, copper, magnesium, manganese, mercury, nickel, lead, tin and/or thallium. Therefore, the disclosure further relates to a process as described above wherein the heavy metals are cations exhibiting metallic properties, and more specifically relates to a process as described above wherein the heavy metals are chosen from the following list: arsenic, cadmium, cobalt, chromium, copper, magnesium, manganese, mercury, nickel, lead, tin and/or thallium.

The term "clay" generally relates to the well-known family of geologically cohesive materials having extremely low hydraulic conductivity, or permeability to liquids and gases. More specifically, the latter term refers to natural soil, dredging soil or sediment, natural clay, silt, bentonite, kaolin, illite, spectate, vermiculite and/or mixtures thereof. Moreover, the disclosure specifically relates to a process as described above wherein the clay is kaolin clay and/or wherein the dredged sediment is dredged from the Kluizendok in Ghent, Belgium. The term "dredged sediment" generally refers to bottom sediments at least partly underwater, in shallow seas or fresh water areas which are excavated or gathered by any dredging device or dredger and which are disposed and used at a different location. The dredging sediment which is used at a different location might contain toxic chemicals such as heavy metals that may have an adverse effect on the disposal area or on the organisms in contact with the area. The disclosure solves the latter problem. The "Kluizendok in Ghent, Belgium" refers to a particular part of the harbor of the city of Ghent (Gent) in Belgium where dredged sediment can be excavated.

Soils composed of clay minerals can carry a net negative charge or positive charge on their surface, depending on the nature of the surface and the pH of the soil. The net negative or positive surface charge is balanced by naturally occurring cationic and/or anionic compounds such as cationic and anionic metals. At high concentrations of the metals, specific sites become saturated and metal cations are potentially mobile and prone to be released.

Figure 1A:
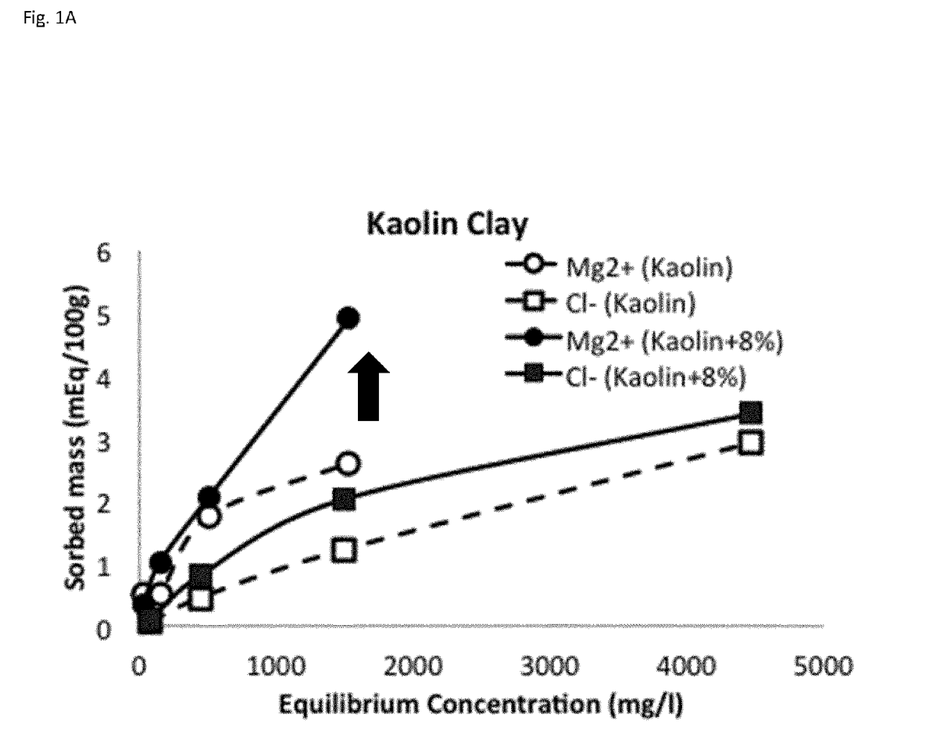
FIG. 1A Sorption isotherms kaolin: the sorbed mass of ions is plotted here vs. the equilibrium concentration. As shown in the graph, batch sorption test (ASTM D 4646) results demonstrate that the sorbed mass of Magnesium cations (a heavy metal) is higher onto the Kaolin clay treated with 8% of the anionic polymer CMC compared to the untreated Kaolin.
Figure 1B:
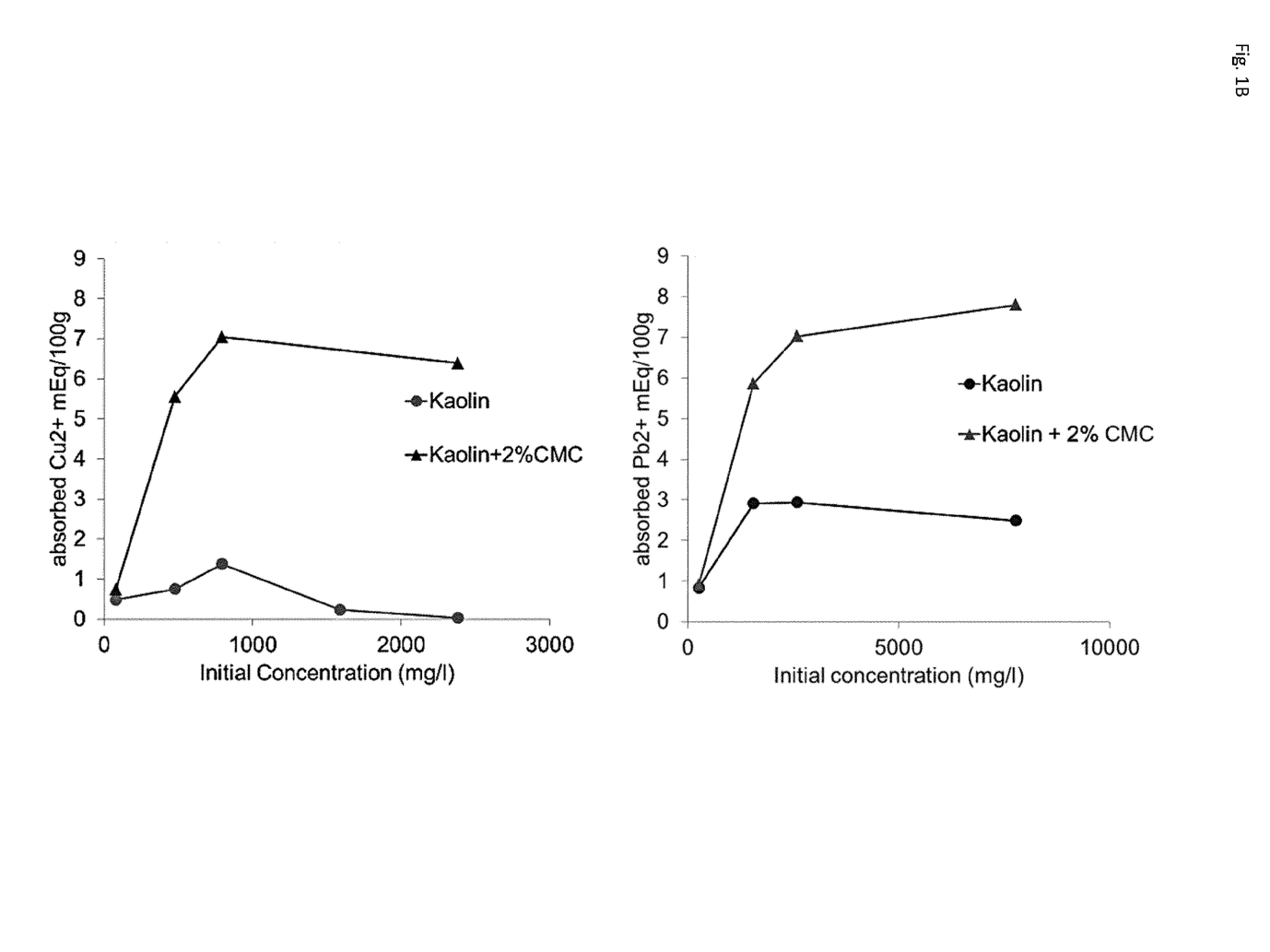
FIG. 1B Adsorption isotherm for kaolin (K) and kaolin with 2% CMC (K2) for lead (Pb) and copper (Cu) (25 g of soil with 100 ml solution).
Figure 2A:
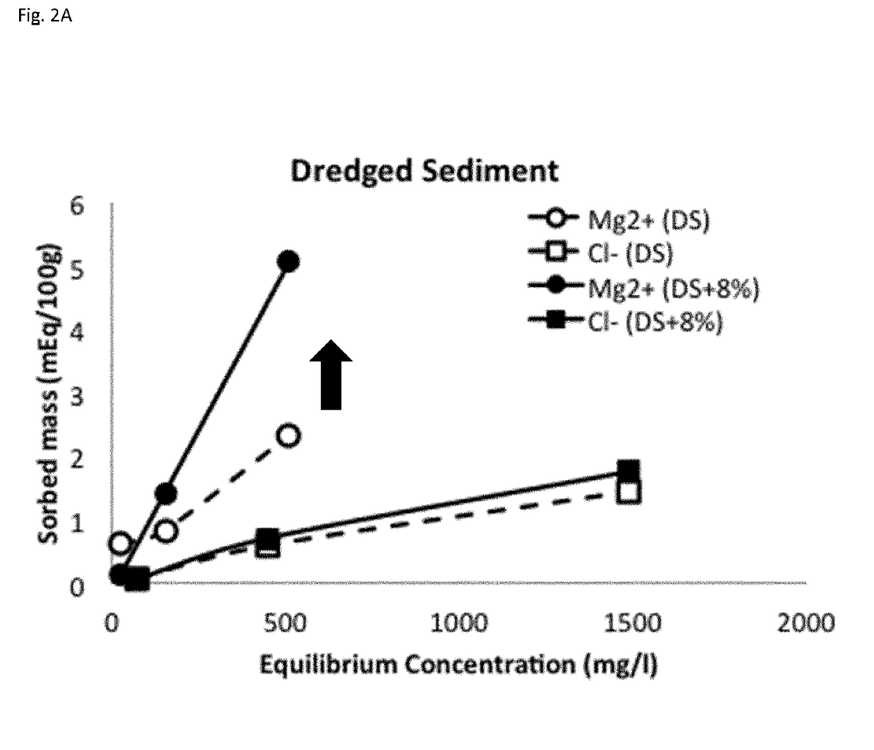
FIG. 2A Sorption isotherms dredged sediment: the sorbed mass of ions is plotted here vs. the equilibrium concentration. As shown in the graph, batch sorption test (ASTM D 4646) results demonstrate that the sorbed mass of Magnesium cations is higher onto the dredged sediment treated with 8% of the anionic polymer CMC compared to the untreated dredged sediment.
Figure 2B:
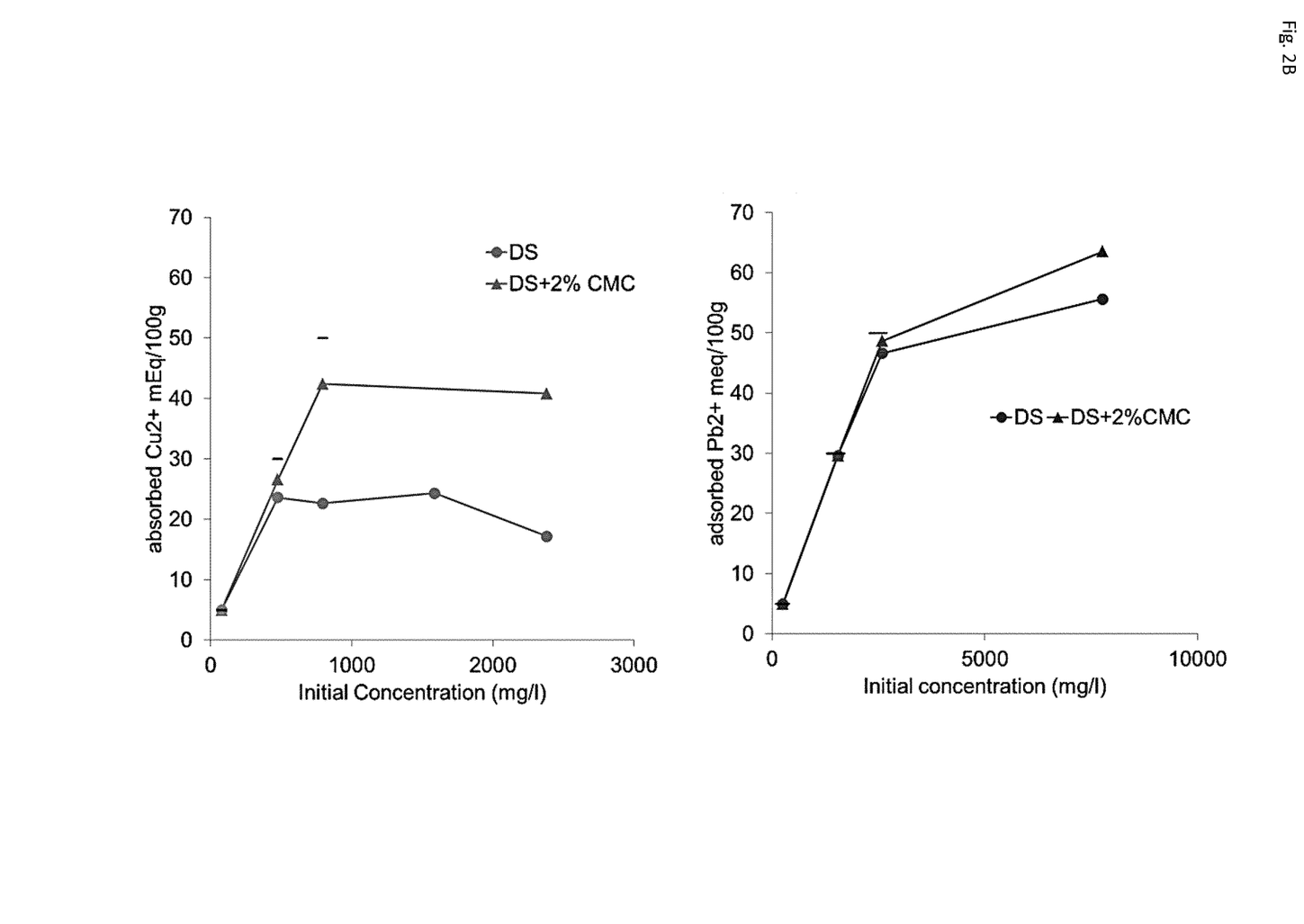
FIG. 2B Adsorption isotherm for dredged sediment (DS) and DS treated with 2% CMC (DS2) with lead (Pb) and copper (Cu) (5 g of soil with 100 ml of solution).

The relationship between a contaminant (=a heavy metal) sorbed onto the soil and that present in soil pore water at equilibrium is known as "a sorption isotherm." FIGS. 1 and 2, for example, show the sorption isotherms of a Kaolin clay and of dredged sediment: the sorbed mass of ions (heavy metals) is plotted vs. the equilibrium concentration.

Figure 3:
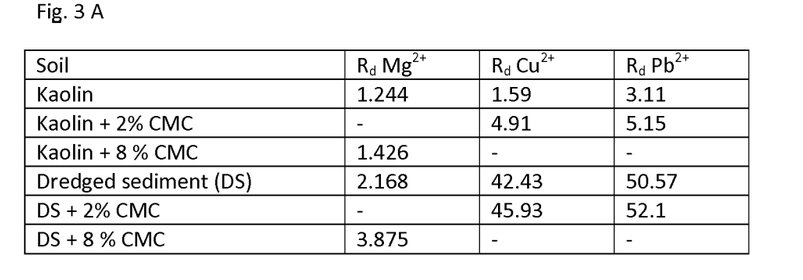
FIG. 3A Retardation factors ($R_d$) of the soil treated and untreated with 2% and 8% of CMC by dry weight. The Retardation factor is generally greater than one meaning that the contaminant migration is lower than the flow of the soil porewater. The higher the retardation factor, the lower the contaminant spread, which is related to the contaminant adsorption. The higher retardation factor of the treated clays as shown here demonstrates that the treated clay have a higher sorption capacity compared to the untreated clays.
FIG. 3B Chemical properties of the solutions used for the Batch Sorption Test.
FIG. 3C Retardation factor in function of initial concentration for kaolinite and copper—Freundlich sorption isotherm model.
FIG. 3D Retardation factor in function of initial concentration for kaolinite and lead—Freundlich sorption isotherm model.
FIG. 3E Retardation factor in function of initial concentration for sediments (5 g) and copper—Freundlich sorption isotherm model.
FIG. 3F Retardation factor in function of initial concentration for sediments (5 g) and lead—Freundlich sorption isotherm model.
Figure 3C:
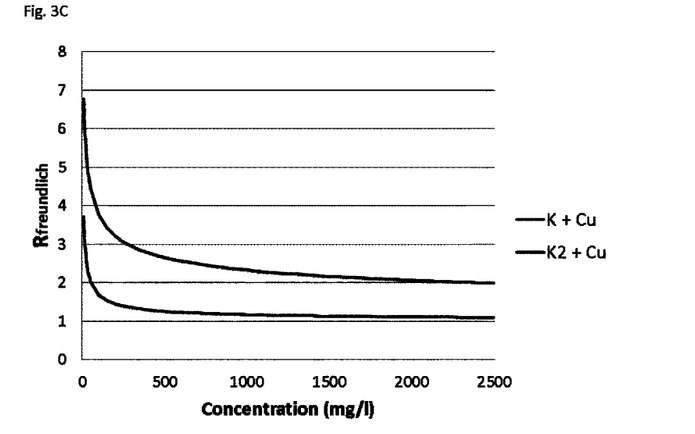
Figure 3D:
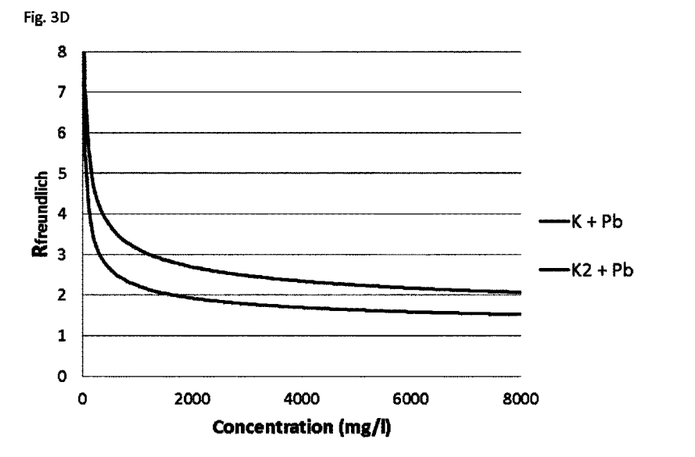
Figure 3E:
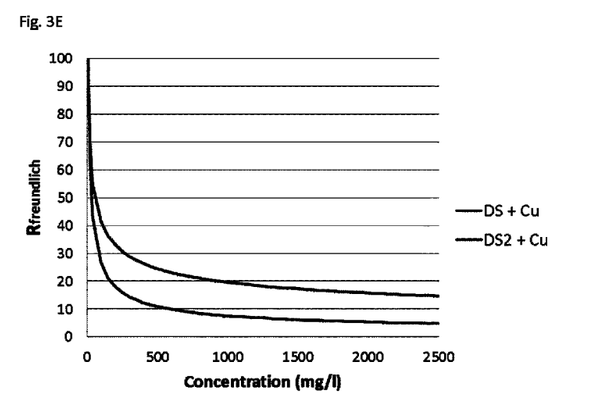
Figure 3F:
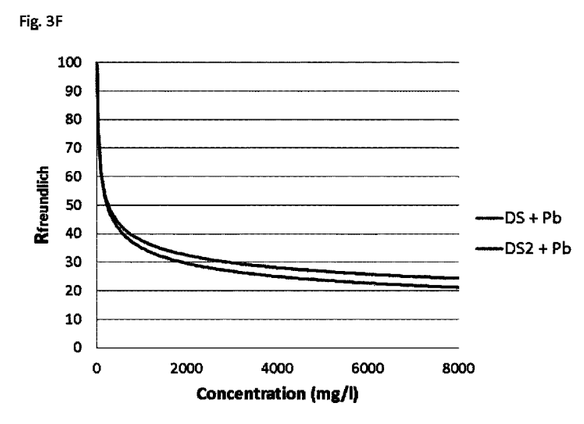

The term "retardation coefficient (or retardation factor)," R, is defined as the ratio $V_s/V_c$ ($V_s$=velocity of the soil pore water and $V_c$=velocity of contaminant). R is generally greater than one, this means that the contaminant migration is lower than the flow of the soil pore water. The higher the retardation factor ($R_d$), the lower the contaminant spread. The Batch sorption test (ASTM D4646) allows the determination of R. The slope of the sorption isotherm (as, for example, shown in FIGS. 1 and 2) is defined as partitioning coefficient $K_d$. The $K_d$ is used to define the retardation coefficient, $R=1+\rho_d K_d/n$ (where $\rho_d$=dry density of the soil;

n=porosity of the soil). FIG. 3 shows the retardation coefficients (R) of the ions in the untreated and treated soils. As shown in the figures, the Retardation factors of the ions referred to the treated soils (Kaolin and the dredged sediment treated with 2% and 8% Na—CMC) were higher compared to those of the untreated soils, strengthening the results shown in FIGS. 1A, 2A, 1B and 2B, that the adsorption of the magnesium, copper and lead was improved by the polymer treatment.

The terms "anionic polymer," "mixing the clay or dredged sediment with 2 up to 16% by dry weight of the anionic polymer," "sodium carboxymethyl cellulose," "drying occurring at a temperature higher than 45° C. or higher than 65° C.," "drying occurring at air or under vacuum," and "drying is dehydration resulting in a powder" are in detail described in chapter "description of the invention" of WO 2012/025564. In short, WO 2012/025564 discloses that in order to obtain an irreversible adsorption of an anionic polymer such as, but not limited to, sodium carboxymethyl cellulose to any clay or dredged sediment, the anionic polymer should be mixed, using commonly known methods, with the clay/sediment is such a proportion that preferably 2 up to 16% by dry weight of the anionic polymer is mixed with the clay or sediment. Moreover, it is important that the mixing step is followed by a drying step (=removing water molecules from the mixture) which can be undertaken by any method known in the art such as oven drying, drying by microwave, drying at air or under vacuum as long as the drying occurs at high temperatures (i.e., at temperatures higher than 45° C. or higher than 65° C.). A temperature higher than 45° C. means a temperature of 46, 47, 48, 49, 50, 51, 52, 53, 54, 55, 56, 57, 58, 59, 60, 61, 62, 63, 63 or 66° C. Similarly, a temperature higher than 65° C. means a temperature of 66, 67, 68, 69, 70, . . . , 75, . . . , 80, . . . , 85, . . . , 90, . . . , 100, . . . , 105, . . . , 110 . . . ° C. By the term "drying" can also mean "dehydrating" in order to obtain a powder.

Hence, the disclosure relates to a process as described above wherein the clay or dredged sediment is mixed with 2 up to 16% by dry weight of the anionic polymer. This means that, for example, 100 g clay or dredged sediment is mixed with 2, 3, 4, 5, 6, 7, 8, 9, 10, 11, 12, 13, 14, 15 or 16 g anionic polymer.

The disclosure further relates to a process as described above wherein the anionic polymer is sodium carboxymethyl cellulose. Carboxymethyl cellulose (CMC) is a cellulose derivative with carboxymethyl groups (—CH2—COOH) bound to some of the hydroxyl groups of the glucopyranosemonomers that make up the cellulose backbone. It is often used as its sodium salt, Sodium Carboxymethyl Cellulose (Na—CMC). The CMC is synthesized by the alkali-catalyzed reaction of cellulose with chloroacetic acid. The polar (organic acid) carboxyl groups render the cellulose soluble and chemically reactive. The functional properties of CMC depend on the degree of substitution of the cellulose structure (i.e., how many of the hydroxyl groups have taken part in the substitution reaction), as well as the chain length of the cellulose backbone structure and the degree of clustering of the carboxymethyl substituents. It is used primarily because it has high viscosity, is non-toxic, and is non-allergenic. A skilled person will appreciate that other "anionic" polymers than CMC such as polyacrylates, polyacrylamides, any anionic polymer capable to adsorb on to the clay/dredged sediment surface through the cations that behave like bridges, any anionic or non-ionic polymer able to intercalate the interlayer region of a clay/dredged sediment and able to maintain a thick diffuse double layer, any water adsorbent polymer and/or any mixture thereof can be used. A skilled person will further appreciate that, instead of an anionic polymer, also an anionic surfactant can be used in the composition of the disclosure. A surfactant can be classified by the presence of formally charged groups in its head. If the charge is negative, the surfactant is specifically called "anionic." Some commonly encountered anionic surfactants are: a) sulfates such as alkyl sulfates (ammonium lauryl sulfate, sodium lauryl sulfate (SDS)) and alkyl ether sulfates (sodium laureth sulfate, also known as sodium lauryl ether sulfate (SLES), sodium myreth sulfate), b) sulfonates such as docusates (dioctyl sodium sulfosuccinate), sulfonate fluorosurfactants (perfluorooctanesulfonate (PFOS), perfluorobutanesulfonate) and alkyl benzene sulfonates; c) phosphates such as alkyl aryl ether phosphate and alkyl ether phosphate and d) carboxylates such as alkyl carboxylates (fatty acid salts (soaps): sodium stearate), sodium lauroyl sarcosinate and carboxylate fluorosurfactants (perfluorononanoate, perfluorooctanoate (PFOA or PFO)) . . .

Moreover, the disclosure relates to a process as described above wherein the drying occurs at a temperature higher than 65° C. A temperature higher than 65° C. means, for example, a temperature of 66° C., 70° C., 80° C., 90° C., 100° C., 105° C., 110° C., 115° C., 120° C., . . .

The disclosure further relates to a process according as described above wherein the drying occurs at air or under vacuum. In another aspect, the disclosure relates to a process as described above wherein the drying is dehydration resulting in a powder.

The disclosure, thus, relates to the usage of an anionic polymer, as described above, to significantly increase the adsorption capacity of clay or dredged soil to heavy metals. The latter usage can be performed by the processes as described above.

More specifically, the disclosure relates to the usage, as described above, wherein the increase is at least 20% higher than the sum of the adsorption capacity of the anionic polymer and the adsorption capacity of the clay or dredged soil. Indeed, and as indicated above, the disclosure demonstrates that a mixture of clay (or dredged sediment) and anionic polymer, which is dried after the mixing at a temperature higher than 45° C., will adsorb significantly (i.e., synergistically) more heavy metals than could be predicted by simply adding the adsorption capacity of clay (or dredged sediment) and the adsorption capacity of an anionic polymer alone. With the term "synergistically" or "significantly" is meant that the increase is at least 20% (i.e., 20, 30, 40, 50, 60, 70, 80, 90, 100% or more) higher than the sum or addition of the adsorption capacity of clay or dredged sediment alone and the adsorption capacity of the anionic polymer alone.

The term "sorption" refers to contaminants attached to mineral grains and organic matter in the soil. Sorption encompasses various processes, such as adsorption, chemisorption, and adsorption. Adsorption refers to contaminants clinging to a solid surface. Chemisorption refers to contaminants incorporating on soil surface by a chemical reaction. Absorption refers to contaminants diffusing into the particle and being adsorbed onto interior surfaces. Generally, we are interested in the combined effect of all these processes, collectively known as sorption. Sorption defines the contaminant distribution between the solution and solid phase; therefore, it is also known as partitioning (Sharma & Reddy, 2004).

The disclosure will now be illustrated by the following non-limiting examples.

EXAMPLES

Materials and Solutions

Two base materials were used. One is a commercially processed kaolin (K) (Rotoclay 11B® from St. Austell, UK) and the other is a dredged sediment (DS), dredged by DEME from the Kluizendok in Ghent. Both materials were treated with an anionic polymer, Sodium CarboxyMethylCellulose (Na—CMC). The adsorption test was performed as a batch sorption test following ASTM D4646, in which the untreated and treated soils (K and DS) were mixed with $MgCl_2$, $Cu(NO_3)_2$, and $Pb(NO_3)_2$ solutions with different concentrations and then again separated. By measuring the amount of $Mg^{2+}$, $Cu^{2+}$, $Pb^{2+}$ cations, before and after the batch sorption test, the adsorption characteristics can be analyzed.

Some solutions were used in the realization of this test: 1) Deionized water and 2) a series of various $MgCl_2$, $Cu(NO_3)_2$, and $Pb(NO_3)_2$ solutions with different concentrations. The deionized water was produced in the laboratory by a PURELAB Option-R 7/15 Elga water treatment apparatus. The deionized water had an Electrical conductivity of 0.0039 mS/cm, pH pf 7.57 and a Redox potential equal to 293 mV. The deionized water was used to prepare the polymeric solution used to treat the modified clays and as reference solution for the batch sorption test. To study the adsorption properties of the treated and untreated clays, $MgCl_2$, $Cu(NO_3)_2$, and $Pb(NO_3)_2$ solutions at various concentrations were used here ($Mg^{2+}$ was used as first preliminary trial to simulate heavy metal cations tested later, such as $Cu^{2+}$ and $Pb^{2+}$). The adsorption of the cations and anions gives in general an indication of the overall adsorption properties of the materials. These solutions were also chosen to be able to compare the results on the untreated kaolin with existing data.

Different solutions were used for the batch sorption tests. These solutions were prepared by mixing deionized water with a certain amount of $MgCl_2.6H_2O$, or $Cu(NO_3)_2.3H_2O$, and $Pb(NO_3)_2$ molecules. A simple calculation gives the number of grams of this substance that needs to be added in order to obtain solutions with the concentrations indicated in FIG. 3B, where the chemical properties of the different solutions are also summarized.

Treatment of the Soil with HYPER Clay Method

Figure 4:
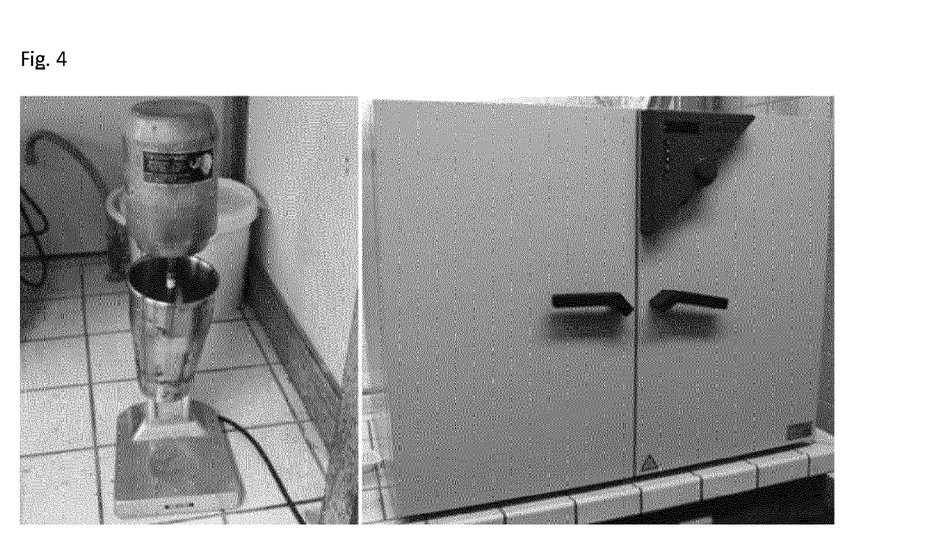
FIG. 4 Mechanical stirrer and ventilated oven used for the preparation of the polymer treated clays.
Figure 5:
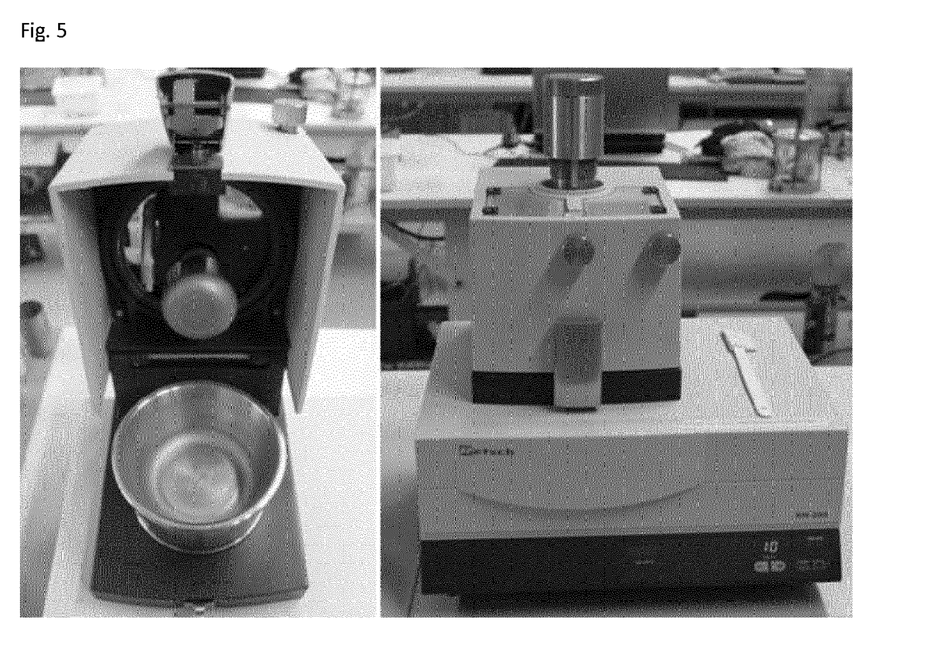
FIG. 5 Retch Mortar Grinder RM 200 used to grind the polymer treated clays.

The soils were treated following the HYPER clay method (WO 2012/025564). 2 or 8 grams of the anionic polymer (Na—CMC) were diluted in 500 ml of deionized water while mixing into a cup of a high speed mechanical stirrer (FIG. 4, left). Then 100 g of soil (K or DS) were added while stirring, and the slurry was left to mix for about 30 minutes. The slurry was then placed in the oven at 105 Celsius degrees to dry overnight (about 16 hours). Once the material was dry, it was grinded, first manually, in a mortar to reach particles of about 3 mm size. After this initial coarse crushing, the material was mechanically grinded in a Retch Mortar Grinder RM 200 (FIG. 5). The soil was poured in the grinder in amounts of ten grams milled for 10 minutes. After this, the modified soil is ready for use in the batch sorption test.

Batch Sorption Test

Figure 6:
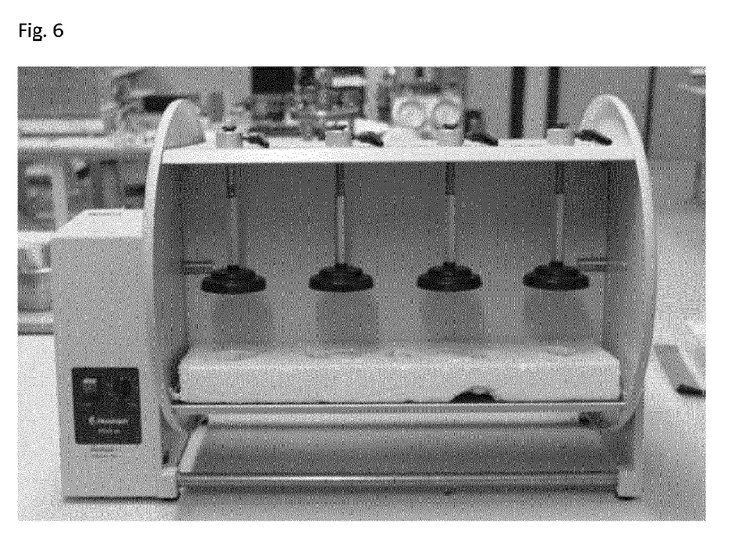
FIG. 6 Rotatory table used to put on contact the soil and solution while mixing for 16 hours for the Batch Sorption Test.
Figure 7:
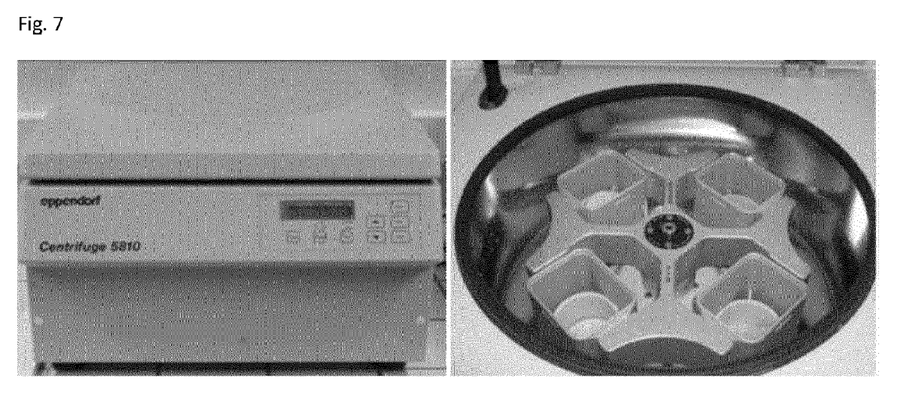
FIGS. 7 and 8 Eppendorf and Jouan centrifuges of different maximum speeds used to separate the soil from the solutions for the Batch Sorption Test.
Figure 8:
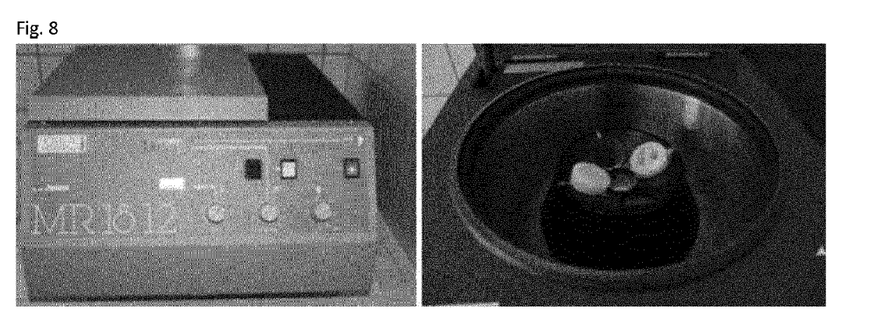

The batch sorption test is carried out following ASTM D4646. The ratio of soil:solution used here was 1:4 or 1:20. 5 or 25 grams of finely soil were mixed with 100 grams of a specific solution. The soil and the solution were then mixed for 16 hours in a rotatory table (FIG. 6). After mixing, the slurry was placed in a centrifuge (such as an Eppendorf Centrifuge 5810 shown in FIG. 7). The ASTM D4646 provides a formula for the calculation of the rotational speed and duration time in order to separate the soil from the solution. The slurry was centrifuged for 10 minutes at a speed of 2510 rotations per minute. This method was successful for the untreated K and DS clays. However, the kaolin and dredged sediment treated with 2% and 8% Na—CMC did not separate properly after rotation at this speed. In order to obtain a proper separation of these slurries, a different type of centrifuge able to reach high speeds was necessary. For this purpose a Jouan M18.12 centrifuge was used (FIG. 8). The two mixtures were rotated for 30 minutes at 10000 revolutions per minute.

Figure 9:
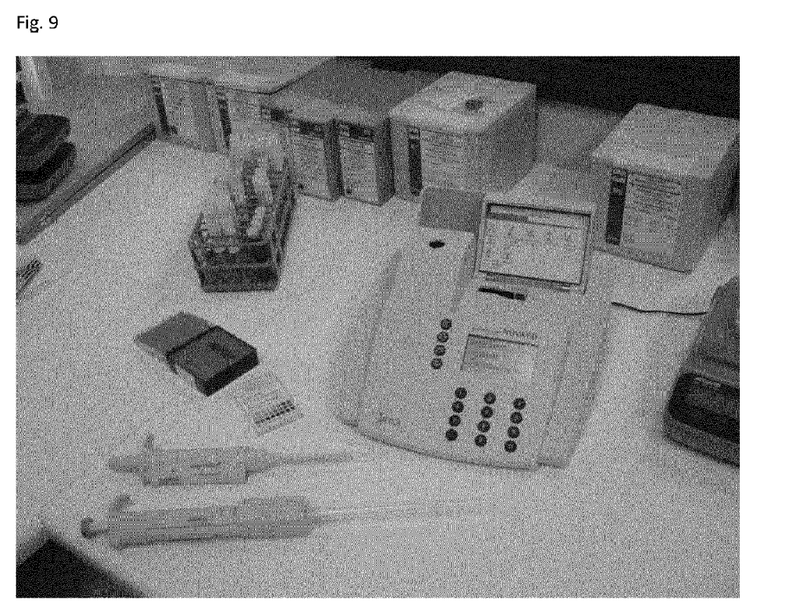
FIG. 9 Perkin Elmer Spectroquant™ Analysis System consisting of a Photometer Spectroquant™ NOVA 60 and Spectroquant™ test kits, used for the determination of the concentration of the ions in the solutions before and after contact with the soil.

To obtain the adsorbed mass of ions onto the soils, the ions concentration of the fresh solutions (before contact with the soil) and the centrifuged separated solutions (after contact with the soil) were analyzed using a Perkin Elmer Spectroquant Analysis System, consisting of a Photometer Spectroquant NOVA 60 and Spectroquant test kits (FIG. 9). The sorption isotherms of the different materials were then plotted (FIGS. 1A, 2A, 1B and 2B). The sorption isotherm shows the relationship between the mass of adsorbed ions and the equilibrium concentration of ions in the solution which was used in the execution of the batch sorption test. Finally, also the retardation factor ($R_d$) was calculated using the slope of the sorption isotherms (linear method) (FIG. 3A) and the Freundlich sorption isotherm model (FIGS. 3C, 3D, 3E, 3F). The sorption isotherms were plotted based on the adsorbed mass of ions expressed in meq/100 g of soil. Both tests showed the superior ability of the polymer treated clay in terms of contaminants adsorption capacity.

Synergistic and Unpredictable Effect

According to the literature, CMC adsorbs heavy metals through chelation of the carboxyl group. In the so-called "HYPER" clays of the disclosure, the CMC rather, and surprisingly, behave as a "clay surface." By doing so, they likely acquire the adsorption mechanisms of a clay, and trigger and amplify the adsorption capacity of hyper clay compared to the sum of the adsorption capacities of soil and CMC.

Indeed, the polymer (CMC) alone adsorbs 0.5 meq of $Cu^{2+}$ over 100 g of HYPER clay (which contains 2 g of CMC) and 0.3 meq/100 g for $Pb^{2+}$ (Bayramoglu et al., 2003). The kaolin alone is able to adsorb 1.5 meq/100 g of $Cu^{2+}$ and 3 meq/100 g of $Pb^{2+}$. The dredged sediment alone adsorbs 25 meq/100 g of $Cu^{2+}$ and 50 meq/100 g of $Pb^{2+}$. The treated kaolin (+2% CMC) surprisingly adsorbs 7 meq/100 g of $Cu^{2+}$ and 7.5 $Pb^{2+}$. The treated dredged sediment (+2% CMC) surprisingly adsorbs 40 meq/100 g of $Cu^{2+}$ and 65 meq/100 g $Pb^{2+}$.

The invention claimed is:

1. Process for adsorbing heavy metals onto clay or dredged sediment, or for adsorbing and retaining heavy metals present in dredged sediment, the method comprising:
   a) mixing the clay or the dredged sediment with a solution comprising an anionic polymer in order to obtain a mixture, then
   b) drying the mixture at a temperature greater than 45° C. in order to irreversibly adsorb the anionic polymer onto the clay or dredged sediment and to form a dried mixture, and
   c) adsorbing the heavy metals onto the dried mixture.

2. A process according to claim 1, wherein the heavy metals are cations exhibiting metallic properties.

3. A process according to claim 1, wherein the heavy metals are selected from the group consisting of arsenic, cadmium, cobalt, chromium, copper, magnesium, manganese, mercury, nickel, lead, tin, thallium, or a mixture of any thereof.

4. A process according to claim 1, wherein the clay is kaolin clay.

5. A process according to claim 1, wherein the clay or dredged sediment is mixed with 2 up to 16% by dry weight of the anionic polymer.

6. A process according to claim 1, wherein the anionic polymer is sodium carboxymethyl cellulose.

7. A process according to claim 1, wherein the drying occurs at a temperature greater than 65° C.

8. A process according to claim 1, wherein the drying occurs under vacuum.

9. A process according to claim 1, wherein the drying is dehydration resulting in a powder.

10. A method of treating clay or dredged sediment to enhance heavy metal adsorption thereon in comparison to clay or dredged sediment not so treated, the method comprising:
    mixing the clay or the dredged sediment with a solution comprising an anionic polymer in order to obtain a mixture, wherein the clay or dredged sediment is mixed with 2% up to 16% by dry weight of the anionic polymer, then
    drying the mixture at a temperature greater than about 45° C. in order to irreversibly adsorb the anionic polymer onto the clay or dredged sediment and to form a dried mixture, and
    adsorbing heavy metal to said dried mixture,
    wherein the dried mixture adsorbs more heavy metal than the clay or dredged sediment and the anionic polymer combined.

11. The method according to claim 10, wherein the heavy metal is a cation exhibiting metallic properties.

12. The method according to claim 11, wherein the heavy metal is selected from the group consisting of arsenic, cadmium, cobalt, chromium, copper, magnesium, manganese, mercury, nickel, lead, tin, thallium, and mixtures of any thereof.

13. The method according to claim 11, wherein the clay is kaolin clay.

14. The method according to claim 11, wherein the anionic polymer comprises sodium carboxymethyl cellulose.

15. The method according to claim 11, wherein the drying occurs at a temperature greater than 65° C.

16. The method according to claim 11, wherein the drying occurs under vacuum.

17. The process according to claim 1, wherein the drying occurs at atmospheric pressure.

18. The method according to claim 14, wherein the drying occurs under vacuum.

* * * * *